United States Patent
VanBlon et al.

(10) Patent No.: US 11,237,466 B2
(45) Date of Patent: Feb. 1, 2022

(54) APPARATUS, METHOD, AND PROGRAM PRODUCT FOR HANDS-FREE CONTROLLING OF PROJECTION BASED ON VIEWING CONTEXT

(71) Applicant: LENOVO (Singapore) PTE. LTD., New Tech Park (SG)

(72) Inventors: Russell Speight VanBlon, Raleigh, NC (US); Kevin Wayne Beck, Raleigh, NC (US); Roderick Echols, Chapel Hill, NC (US); Ryan Charles Knudson, Tampa, FL (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/786,898

(22) Filed: Feb. 10, 2020

(65) Prior Publication Data

US 2021/0247668 A1    Aug. 12, 2021

(51) Int. Cl.
*G03B 21/14* (2006.01)
*G06F 3/01* (2006.01)
*G01B 11/02* (2006.01)
*G06F 3/16* (2006.01)

(52) U.S. Cl.
CPC .......... *G03B 21/142* (2013.01); *G01B 11/026* (2013.01); *G03B 21/145* (2013.01); *G06F 3/013* (2013.01); *G06F 3/167* (2013.01)

(58) Field of Classification Search
CPC ..... G03B 21/142; G03B 21/145; G06F 3/167; G06F 3/013; G01B 11/026
See application file for complete search history.

(56) References Cited

U.S. PATENT DOCUMENTS

| | | | | |
|---|---|---|---|---|
| 7,134,080 B2* | 11/2006 | Kjeldsen | ............... | G03B 21/28 |
| | | | | 715/730 |
| 7,530,019 B2* | 5/2009 | Kjeldsen | ............... | G03B 21/28 |
| | | | | 715/730 |
| 8,446,288 B2* | 5/2013 | Mizushima | ............ | H05B 31/50 |
| | | | | 340/691.6 |
| 8,589,796 B2* | 11/2013 | Moesgaard Kjeldsen et al. ......... |
| | | | | H04N 5/74 |
| | | | | 715/730 |
| 8,840,250 B1* | 9/2014 | Yao | ......................... | G01S 17/46 |
| | | | | 353/30 |

(Continued)

*Primary Examiner* — Bao-Luan Q Le
(74) *Attorney, Agent, or Firm* — Kunzler Bean & Adamson

(57) ABSTRACT

Apparatuses, methods, systems, and computer program products are disclosed for controlling projection based on viewing context. An apparatus, in one embodiment, includes a processor and a memory that stores code executable by the processor to determine whether a predetermined condition is satisfied for projecting audiovisual content to a user in a selected viewing context. The apparatus may include sensors that communicates to the processor, parameters of the field of view of the user for the selected viewing context and characteristics of a target viewing surface within the field of view. The apparatus, further includes at least one steerable projector this is controlled, based on the one or more parameters, to project a video portion of the audiovisual content on to the target viewing surface, in response to the processor determining that the predetermined condition is satisfied. Systems, computer program products, and methods may perform the functions of the apparatus.

19 Claims, 6 Drawing Sheets

(56) References Cited

U.S. PATENT DOCUMENTS

| | | | | |
|---|---|---|---|---|
| 8,845,107 B1* | 9/2014 | Coley | G01B 11/022 | 353/28 |
| 8,845,110 B1* | 9/2014 | Worley, III | G03B 17/54 | 353/79 |
| 8,887,043 B1* | 11/2014 | Pollack | G06F 3/017 | 715/702 |
| 8,905,551 B1* | 12/2014 | Worley, III | G03B 21/26 | 353/79 |
| 8,933,974 B1* | 1/2015 | Marason | G03B 21/147 | 345/690 |
| 8,988,662 B1* | 3/2015 | Haskin | G01S 17/003 | 356/5.01 |
| 8,992,050 B1* | 3/2015 | Yuan | H04N 13/25 | 362/293 |
| 9,052,579 B1* | 6/2015 | Poulad | G03B 21/10 | |
| 9,109,886 B1* | 8/2015 | Haskin | G01S 17/66 | |
| 9,118,782 B1* | 8/2015 | Coley | H04N 5/00 | |
| 9,124,786 B1* | 9/2015 | Coley | H04N 5/222 | |
| 9,129,375 B1* | 9/2015 | Liu | G06T 3/0068 | |
| 9,160,904 B1* | 10/2015 | Chang | F16M 13/02 | |
| 9,195,127 B1* | 11/2015 | Marason | G06F 3/0425 | |
| 9,197,870 B1* | 11/2015 | Soyannwo | G06T 19/006 | |
| 9,204,121 B1* | 12/2015 | Marason | G01B 11/2513 | |
| 9,236,000 B1* | 1/2016 | Worley, III | G06F 3/0346 | |
| 9,241,141 B1* | 1/2016 | Chang | H04N 9/3185 | |
| 9,261,759 B1* | 2/2016 | Haskin | H04N 9/3185 | |
| 9,262,983 B1* | 2/2016 | Coley | G06F 3/017 | |
| 9,268,203 B1* | 2/2016 | List | G03B 17/54 | |
| 9,268,520 B1* | 2/2016 | Cederlof | H04N 9/3194 | |
| 9,281,727 B1* | 3/2016 | Coley | G06F 3/0416 | |
| 9,282,301 B1* | 3/2016 | Cederlof | H04N 9/317 | |
| 9,294,746 B1* | 3/2016 | Cederlof | G06F 3/0423 | |
| 9,304,379 B1* | 4/2016 | Wang | G03B 21/208 | |
| 9,323,352 B1* | 4/2016 | Haskin | G06K 9/2036 | |
| 9,336,602 B1* | 5/2016 | Chang | G06T 17/00 | |
| 9,383,831 B1* | 7/2016 | Worley, III | G06T 19/006 | |
| 9,429,833 B1* | 8/2016 | Satoh | G03B 21/26 | |
| 9,430,187 B2* | 8/2016 | Poulad | G03B 21/10 | |
| 9,462,255 B1* | 10/2016 | Marason | G01S 7/4816 | |
| 9,472,005 B1* | 10/2016 | Marason | G01S 17/894 | |
| 9,495,936 B1* | 11/2016 | Norquist | G06F 3/147 | |
| 9,508,137 B2* | 11/2016 | Byers | H04L 67/18 | |
| 9,557,630 B1* | 1/2017 | Marason | G03B 21/28 | |
| 9,664,376 B2* | 5/2017 | Abe | H04N 13/359 | |
| 9,723,293 B1* | 8/2017 | Cederlof | H04N 9/12 | |
| 9,746,752 B1* | 8/2017 | Yuan | H04N 13/25 | |
| 9,759,994 B1* | 9/2017 | Soyannwo | G06T 19/006 | |
| 9,762,862 B1* | 9/2017 | Worley, III | H04N 9/3176 | |
| 9,766,057 B1* | 9/2017 | Coley | G01B 11/022 | |
| 9,870,056 B1* | 1/2018 | Yao | H04N 9/3185 | |
| 9,979,953 B1* | 5/2018 | Marason | H04N 5/141 | |
| 10,031,335 B1* | 7/2018 | Worley, III | H04N 9/3185 | |
| 10,514,256 B1* | 12/2019 | Kamarshi | G01C 3/08 | |
| 10,528,853 B1* | 1/2020 | Yao | G06K 9/6211 | |
| 2004/0036717 A1* | 2/2004 | Kjeldsen | H04N 5/74 | 715/730 |
| 2005/0128437 A1* | 6/2005 | Pingali | H04N 9/3194 | 353/69 |
| 2007/0013716 A1* | 1/2007 | Kjeldsen | G03B 21/28 | 345/594 |
| 2008/0218641 A1* | 9/2008 | Kjeldsen | G03B 21/28 | 348/746 |
| 2010/0289664 A1* | 11/2010 | Mizushima | H04N 9/3161 | 340/691.6 |
| 2015/0261497 A1* | 9/2015 | Poulad | G03B 21/10 | 353/28 |
| 2015/0317835 A1* | 11/2015 | Byers | H04L 67/12 | 345/633 |
| 2016/0025327 A1* | 1/2016 | Abe | G03B 29/00 | 348/744 |

* cited by examiner

APPARATUS, METHOD, AND PROGRAM PRODUCT FOR HANDS-FREE CONTROLLING OF PROJECTION BASED ON VIEWING CONTEXT

FIELD

The subject matter disclosed herein relates to projecting video content and more particularly relates to controlling projection based on viewing context.

BACKGROUND

Some information handling devices such as a laptop or a smartphone can output video to an external display via wireless transmission. Similarly, some information handling devices such as smartphones or smart audio devices can communicate audio information while a user is performing a manual task. For example, some smart digital assistants can give a morning briefing while a user is getting ready to start the day. However, external displays and smart audio devices may be less than ideal for presenting useful information in certain contexts.

BRIEF SUMMARY

Apparatuses, methods, systems, and program products are disclosed for controlling projection based on viewing context. An apparatus, in one embodiment, includes a processor and a memory that stores code executable by the processor to determine whether a predetermined condition is satisfied for projecting audiovisual content to a user in a selected viewing context. In the embodiment, the apparatus includes at least one sensor that communicates to the processor, one or more parameters of the field of view of the user for the selected viewing context and one or more characteristics of a target viewing surface within the field of view. The apparatus of the embodiment further includes at least one steerable projector this is controlled, based on the one or more parameters, to project a video portion of the audiovisual content on to the target viewing surface, in response to the processor determining that the predetermined condition is satisfied.

A method for controlling projection based on viewing context includes, in one embodiment, determining, by use of a processor, whether a predetermined condition is satisfied for projecting a video portion of audiovisual content to a user in a selected viewing context. The method of the embodiment further includes determining one or more parameters of a field of view of the user for the selected viewing context and one or more characteristics of a target viewing surface within the field of view. In the embodiment, the method includes controlling at least one steerable projector, based on the parameters, to project the video portion of the content on to the target viewing surface, in response to determining that the predetermined condition is satisfied.

A program product, in one embodiment, comprises a computer readable storage medium having program instructions embodied therewith, the program instructions executable by a processor to cause the processor to determine whether a predetermined condition is satisfied for projecting a video portion of a content to a user in a selected viewing context. The code is further executable by the processor, in one embodiment, to determine one or more parameters of a field of view of the user for the selected view context and one or more characteristics of a target viewing surface within the field of view and to control at least one steerable projector, based on the parameters, to project the video portion of the content on to the target viewing surface, in response to determining that the predetermined condition is satisfied.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not, therefore, to be considered to be limiting of scope, the embodiments will be described and explained with additional specificity and detail through the use of the accompanying drawings, in which.

DETAILED DESCRIPTION

Figure 1:
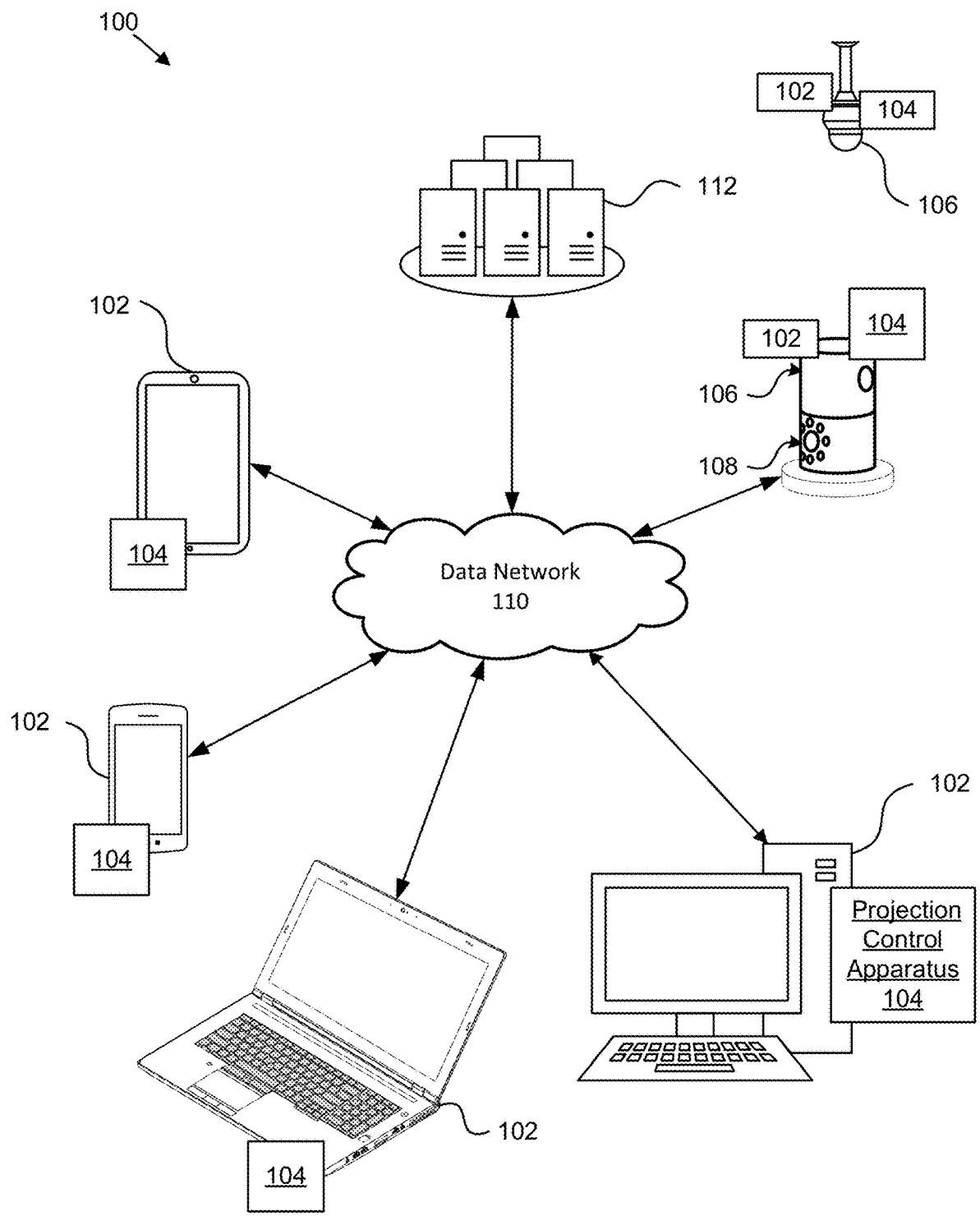
FIG. 1 is a schematic block diagram illustrating one embodiment of a system for controlling projection based on viewing context.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine-readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field-programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, R, Java, JavaScript, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together. Likewise, as used herein, the phrase "at least one of" indicates embodiments of one or more of the listed elements, with "at least one of A and B" indicating embodiments of element A alone, element B alone, or elements A and B taken together. In other words, with respect to listed elements, the terms "and/or", and "at least one of" indicate embodiments of any of the listed elements alone as well as embodiments with any combination of the listed elements.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded on to a computer, other programmable data processing apparatus, or other devices to cause a series of operational steps to be performed on the computer, other programmable apparatus or other devices to produce a computer implemented process such that the code which executes on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus, in one embodiment, includes a processor and a memory that stores code executable by the processor to determine whether a predetermined condition is satisfied for projecting audiovisual content to a user in a selected viewing context. The apparatus in the embodiment, includes at least one sensor that communicates to the processor, one or more parameters of a field of view of the user for the selected viewing context and one or more characteristics of a target viewing surface within the field of view and at least one steerable projector this is controlled, based on the one or more parameters, to project a video portion of the audiovisual content on to the target viewing surface, in response to the processor determining that the predetermined condition is satisfied.

In some embodiments, the selected viewing context comprises an activity to be engaged in by the user in a predetermined location and the performance of the activity is facilitated by projecting the video portion of the audiovisual content on to the target viewing surface. In certain embodiments, one or more hands of the user are available to perform one or more manual tasks based on guidance provided by the video portion of the audiovisual content projected on to the target viewing surface. In various embodiments, the processor performs an adjustment to an output of the at least one steerable projector based on the one or more characteristics of the target viewing surface. In certain embodiments, the adjustment comprises at least one of a color adjustment and a projected object size adjustment.

In various embodiments, the at least one sensor is selected from the group consisting of a distance sensor, an eye-gaze sensor, an imaging sensor, and combinations thereof. In certain embodiments, the at least one sensor is integrated into a housing for the at least one steerable projector. In some embodiments, the processor limits a frequency of change in the field of view.

In some embodiments, the at least one steerable projector comprises a first projector and a second projector and the processor selects the second projector for projecting the video portion of the audiovisual content in response to determining that the video portion of the audiovisual content would be obstructed if projected by the first projector.

In certain embodiments, the apparatus includes at least one audio device that plays an audio portion of the audiovisual content in response to the processor determining that the predetermined condition is satisfied. In some embodiments, the at least one audio device that communicates a voice command from the user to the processor. In various embodiments, the at least one audio device is integrated into a housing for the at least one steerable projector.

A method for controlling projection based on viewing context includes, in one embodiment, determining, by use of a processor, whether a predetermined condition is satisfied for projecting a video portion of audiovisual content to a user in a selected viewing context. The method of the embodiment further includes determining one or more parameters of a field of view of the user for the selected viewing context and one or more characteristics of a target viewing surface within the field of view. In the embodiment, the method includes controlling at least one steerable projector, based on the parameters, to project the video portion of the content on to the target viewing surface, in response to determining that the predetermined condition is satisfied.

In various embodiments, the selected viewing context comprises an activity to be engaged in by the user in a predetermined location and the performance of the activity is facilitated by projecting the content on to the target viewing surface. In certain embodiments, one or more hands of the user are available to perform one or more manual tasks based on guidance provided by the content projected on to the target viewing surface. In some embodiments, the method includes receiving a light measurement of the target viewing surface and performing an adjustment to an output of the at least one steerable projector to enhance the viewability of the content projected on the target viewing surface.

In certain embodiments, the adjustment is selected from a color adjustment, a font size adjustment, and combinations thereof. In some embodiments, determining the one or more parameters is performed by at least one sensor selected from a distance sensor, an eye-gaze sensor, an imaging sensor, and combinations thereof. In various embodiments, the method includes limiting a frequency of change in the field of view.

A computer program product for controlling projection based on viewing context includes, in one embodiment, includes a computer readable storage medium having program instructions embodied therewith, the program instructions executable by a processor to cause the processor to determine whether a predetermined condition is satisfied for projecting a video portion of audiovisual content to a user in a selected viewing context. The code is executable in the embodiment, to determine one or more parameters of a field of view of the user for the selected view context and one or more characteristics of a target viewing surface within the field of view and to control at least one steerable projector, based on the parameters, to project the video portion of the content on to the target viewing surface, in response to determining that the predetermined condition is satisfied.

FIG. 1 is a schematic block diagram illustrating one embodiment of a system 100 for controlling projection based on viewing context. In various embodiments, the system 100 includes one or more information handling devices 102, one or more projection management apparatuses 104, one or more steerable projectors 106, one or more sensors 108, one or more data networks 110, and one or more servers 112. In certain embodiments, even though a specific number of information handling devices 102, projection management apparatuses 104, steerable projectors 106, sensors 108, data networks 110, and servers 112, are depicted as illustrated in FIG. 1, one of skill in the art would may recognize, in light of this disclosure, that any number of information handling devices 102, projection management apparatuses 104, steerable projectors 106, sensors 108, data networks 110, and servers 112, may be included in the system 100.

In one embodiment, the system 100 includes one or more information handling devices 102, such as for example laptops, tablets, smartphones, workstations, and so forth. In one embodiment, the information handling device 102 determines whether a predetermined condition is satisfied for projecting audiovisual content to a user in a selected viewing context. In some embodiments, the system 100 includes at least one sensor 108 that communicates one or more parameters of a field of view of the user for the selected viewing context and one or more characteristics of a target viewing surface within the field of view. In various embodiments, the system 100 includes at least one steerable projector 106 this is controlled, based on the one or more parameters, to project a video portion of the audiovisual content on to the target viewing surface, in response to determining that the predetermined condition is satisfied.

In some embodiments the information handling device 102 includes a processor (e.g., a central processing unit ("CPU"), a processor core, a field-programmable gate array ("FPGA") or other programmable logic, an application-specific integrated circuit ("ASIC"), a controller, a microcontroller, and/or another semiconductor integrated circuit device), a volatile memory, and/or a non-volatile storage medium, and/or the like.

In certain embodiments, the information handling device 102 is included in or coupled to a housing of a steerable projector 106. In other embodiments, one or more information handling devices 102 are separate devices from the steerable projector 106.

In various embodiments, an information handling device 102 includes a display. In certain embodiments, the information handling device 102 includes one or more user interfaces, such as for example, a touchscreen display, a physical keyboard, a mouse, a voice control, or similar user interface devices or accessories. The information handling devices 102 include one or more network interfaces such as for example a wireless connection between the information handling device 102 and the steerable projector 106. In such embodiments, the information handling device 102 may communicate with the steerable projector 106 over a data network 110.

In one embodiment, the system 100 includes a projection management apparatus 104. In some embodiments, the projection management apparatus 104 is implemented in the information handling device 102 either as a software program that runs on a processor of the information handling device 102, as a hardware/firmware implementation, and/or, a combination of hardware and software.

In some embodiments, the projection management apparatus 104 determines whether a predetermined condition is satisfied for projecting audiovisual content to a user in a selected viewing context. In various embodiments, the projection management apparatus communicates with at least one sensor 108 to determine one or more parameters of a field of view of the user for the selected viewing context and one or more characteristics of a target viewing surface within the field of view.

In various embodiments, the system 100 includes a projection management apparatus 104 that controls a steerable projector 106 based on the one or more parameters of the field of view of the user to project a video portion of the audiovisual content on to the target viewing surface in response to determining that the predetermined condition is satisfied. The projection management apparatus 104 is described in more detail below with respect to FIG. 3. In certain embodiments, one or more steerable projectors 106 may be disposed at different locations within the viewing context of the user such as for example on countertops, walls, ceilings, and so forth. One embodiment of a steerable projector 106 is described in more detail with respect to FIG. 2.

In various embodiments, the system 100 includes a sensor 108 that senses one or more parameters of a field of view for the selected viewing context and one or more characteristics of a target viewing surface within the field of view. In certain embodiments, the sensor 108 is included in or coupled to the housing of the steerable projector 106. In other embodiments, the sensor 108 is separate from and in data communication with the projection management apparatus 104. Certain embodiments of the sensor 108 are described in more detail with respect to FIG. 2.

In certain embodiments, the system 100 includes a data network 110 and the information handling devices 102 are communicatively coupled to one or more other information handling devices 102 and/or to one or more servers 112 over the data network 110, described below. The information handling devices 102, in a further embodiment, may include processors, processor cores, and/or the like that execute various programs, program code, applications, instructions, functions, and/or the like. For example, in some embodiments, the information handling devices 102 use the data network 110 to download application-specific digital pen software or to update digital pen data such as light sensor color calibration, and/or digital pen profiles for later use.

The data network 110, in one embodiment, includes a digital communication network that transmits digital communications. The data network 110 may include a wireless network, such as a wireless cellular network, a local wireless network, such as a Wi-Fi network, an ad hoc network, and/or the like. The data network 110 may include a wide area network ("WAN"), a local area network ("LAN"), an optical fiber network, the internet, or other digital communications network. The data network 110 may include two or more networks. The data network 110 may include one or more servers, routers, switches, and/or other networking equipment. The data network 110 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. All standards and/or connection types include the latest version and revision of the standard and/or connection type as of the filing date of this application.

The one or more servers 112, in one embodiment, may be embodied as blade servers, mainframe servers, tower servers, rack servers, and/or the like. The one or more servers 112 may be configured as mail servers, web servers, application servers, FTP servers, media servers, data servers, web servers, file servers, virtual servers, and/or the like. The one or more servers 112 may be communicatively coupled (e.g., networked) over a data network 110 to one or more information handling devices 102. The servers 112 may comprise back-end servers for facilitating machine translation of text/speech, analysis of machine-translated text using artificial intelligence, marking-up a copy of the machine-translated text, and/or the like.

Figure 2:
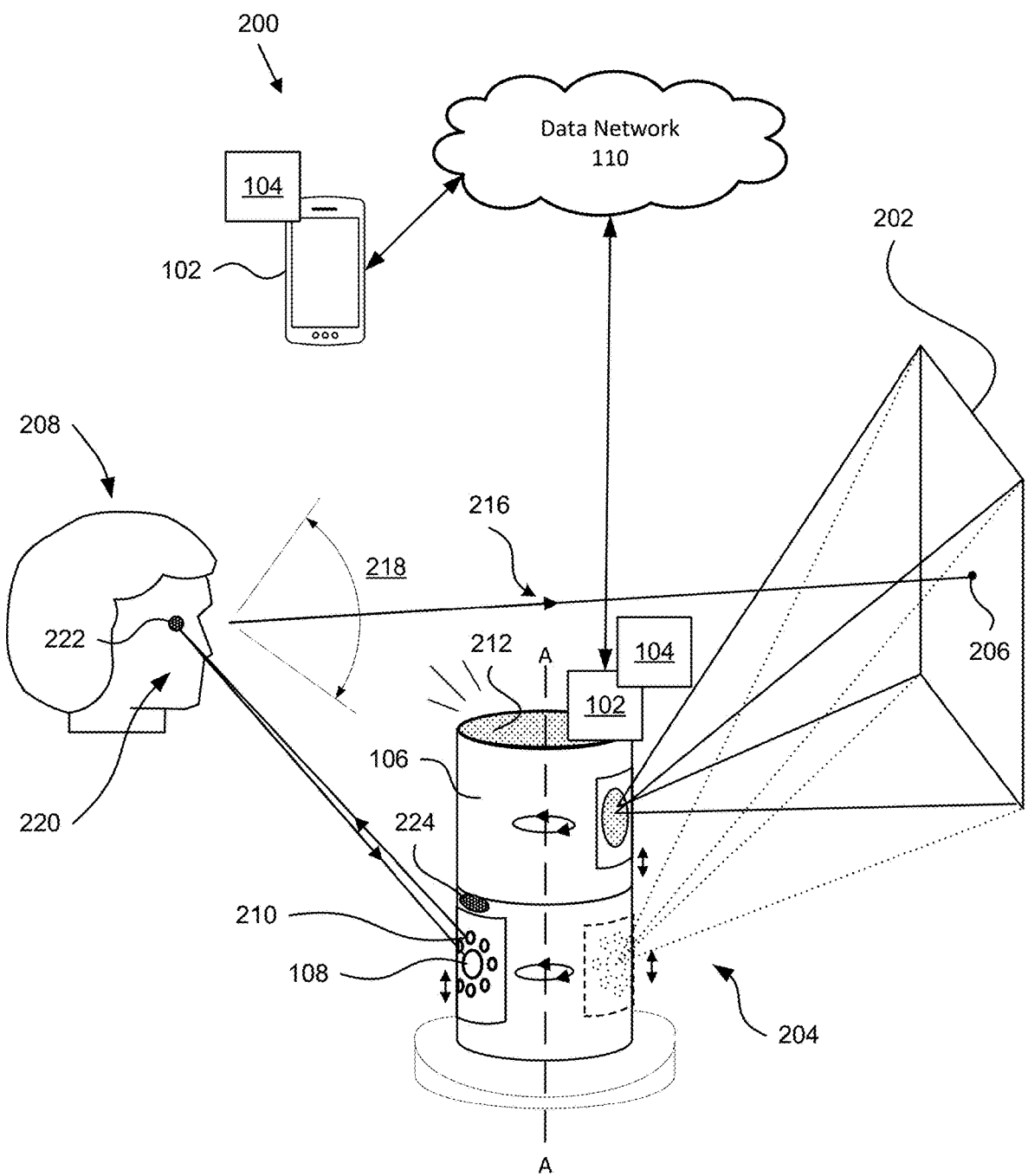
FIG. 2 is a drawing illustrating one embodiment of an apparatus for controlling projection based on viewing context.

FIG. 2 is a drawing illustrating one embodiment of an apparatus 200 that includes an information handling device 102, a projection management apparatus 104, and a steerable projector 106 for projecting a video portion of audiovisual content on to a target viewing surface 202. In some embodiments, the information handling device 102 and the steerable projector 106 are implemented in the same housing 204. Similarly, in various embodiments, the projection management apparatus 104 may be implemented in the information handling device 102.

In certain embodiments, the apparatus 200 includes at least one sensor 108 the senses one or more parameters of a field of view 218 (such as for example an area surrounding a gaze point 206) of a user 208. In some embodiments, the at least one sensor 108 may include a camera for capturing images of a face 220 and eye(s) 222 of a user 208 for determining the field of view 218, a gaze direction 216, gaze point 206, and/or other similar viewing context parameters related to the user 208.

In other embodiments, more than one information handling device 102 is used to implement various functions of the projection management apparatus 104. For example, a first information handling device 102 may be an external device such as a smartphone, laptop, tablet, or the like, that implements functions of the projection management apparatus 104 which relate to content selection, general user context parameters including user identity, general user location, and so forth. The first information handling device 102 may communicate to a second information handling device 102 over the data network 110, using Wi-Fi, Bluetooth®, or any suitable network protocol.

In some embodiments, the first information handling device 102 stores local audiovisual content having a video portion to be projected on the target viewing surface 202. In one embodiment, the apparatus 200 may include a second information handling device 102 such as a processor, memory, interfaces, etc., that are within or coupled to the housing 204 of the steerable projector 106. In certain embodiments, the first information handling device 102 is used to select video content stored on a server 112 for streaming over the data network 110 to the second information handling device 102 e.g., disposed in the housing of the steerable projector 106. In further embodiments, the second information handling device 102 stores audiovisual content locally such as for example on a memory such as a microSD card solid-state drive, or similar storage device.

The second information handling device 102 may, in such embodiments, implement other functions of the projection management apparatus 104, such as for example, precision location determination, viewing surface detection, gaze tracking, and or/projection control. It may be noted by the person of skill in the art that steerable projector 106 may be a stand-alone smart assistant type of device or may be a peripheral smart home device that communicates with a smart hub, which in turn communicates with one or more smartphones, tablets, laptop computers, desktop computers, and the like.

In one embodiment, the steerable projector 106 and the at least one sensor 108 may both be implemented in the housing 204. In some embodiments, the at least one sensor 108 may include emitting components and detecting components. For example, the at least one sensor 108 may include a camera that senses both visible and infrared light as well as one or more surrounding infrared light-emitting diodes that illuminate the face 220 and/or the eyes 222 of the user 208 in order to facilitate easier gaze detection, identity, precision location, and so forth.

In some embodiments, the at least one sensor 108 may include a high accuracy distance sensor, such as for example, a time-of-flight sensor, a Light Detection and Ranging ("LiDAR" or "lidar") sensor or similar sensor for determining distances to an object such as the user 208, the eyes 222, various points in a plane (e.g., the target viewing surface 202) or on a perimeter of the target viewing surface 202 within the field of view 218 of the user 208, and so forth. In various embodiments, the at least one sensor 108 may include both a high accuracy distance sensor and a camera. In certain embodiments, the at least one sensor 108 may be controlled to pan, tilt, zoom, etc., to sense the object or objects of interest.

In various embodiments, the steerable projector 106 may be controlled, based on the user field of view parameters sensed by the at least one sensor 108, to project a video portion of the audiovisual content on to the target viewing surface 202. In some embodiments, the steerable projector may include one or more motors, gears, or other electromechanical mechanisms that may be controlled by a processor and/or interfaces of the information handling device 102.

In certain embodiments, a first portion of the housing 204 such as the portion housing the steerable projector 106 may be panned and/or tilted (as indicated respectively by the horizontal double arrows depicting horizontal rotation in either direction around a vertical central axis A-A of the steerable projector 106 and/or the vertical double arrows depicted to the right of the steerable projector 106) independently of a second portion of the housing 204 such as a portion housing the sensor 108 so that viewing context inputs determined by the sensor 108 and the video output components of the steerable projector 106 can be can be controlled to point in different directions.

In some embodiments, the apparatus 200 includes an audio output 212 such as for example a loudspeaker, an interface to Bluetooth® or similar wireless speaker, etc. In certain embodiments, the audio output 212 projects an audio portion of the audiovisual content such as for example a soundtrack of the video clip. In various embodiments, the apparatus 200 includes an audio input 224, such as for example a microphone that receives audio input, such as for example, voice commands from the user 208.

Additional details regarding the various complements and functions of the at least one information handling device 102, the projection management apparatus 104, and the steerable projector 106 are described below with respect to FIG. 3, and FIG. 4.

Figure 3:
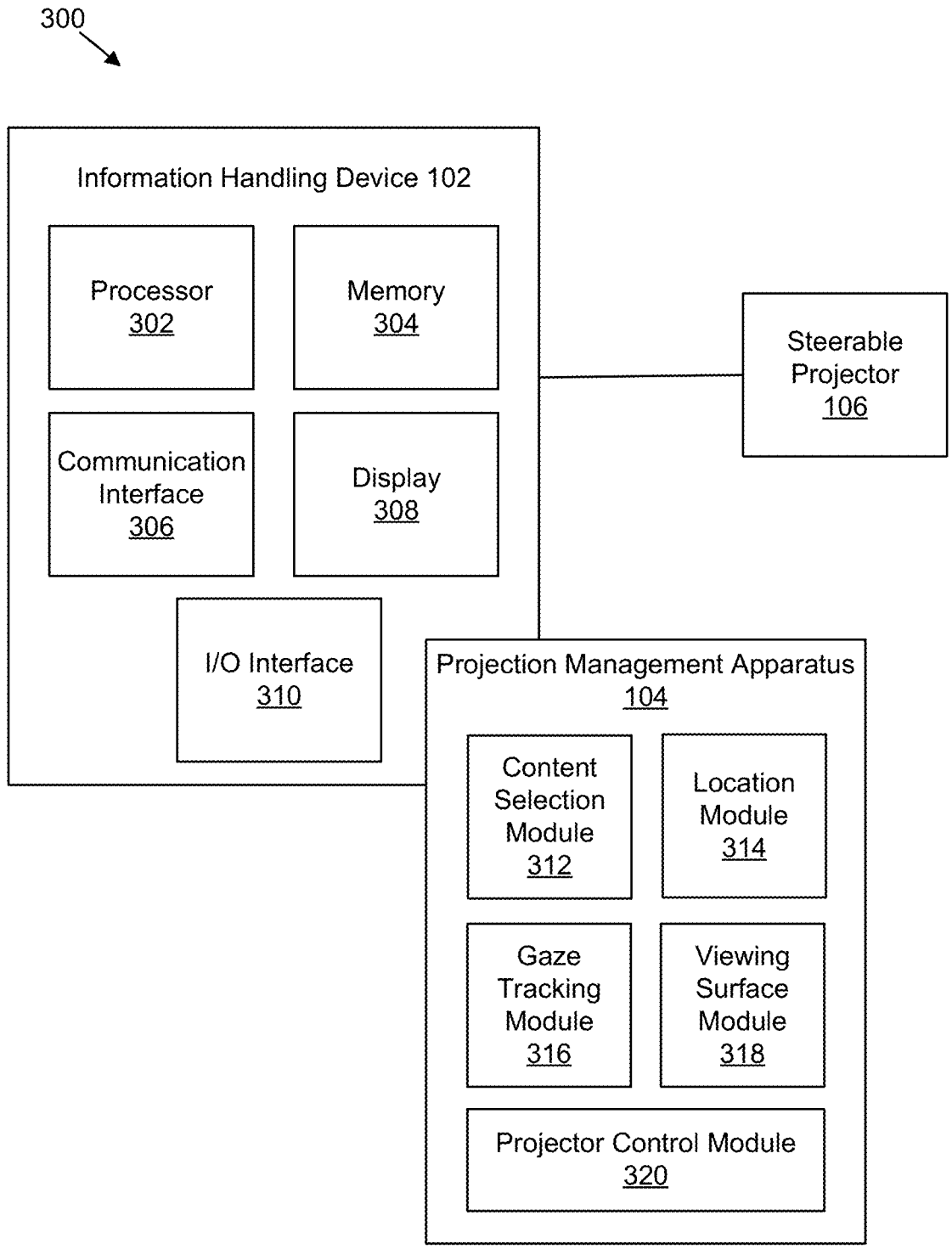
FIG. 3 is a schematic block diagram illustrating one embodiment of a system for controlling projection based on viewing context.

FIG. 3 is a schematic block diagram illustrating one embodiment of an apparatus 300 that includes an instance of an information handling device 102 with a projection management apparatus 104. In one embodiment, the information handling device 102 includes a processor 302, a memory 304, a communication interface 306, a display 308, and an I/O interface 310. The memory 304 may include a semiconductor storage device, a hard disk drive, an optical storage device, a micromechanical storage device, or combinations thereof. The memory 304 may store code. The processor 302 may execute the code. The communication interface 306 may communicate with other devices. The display 308 may display color output. The apparatus 300 may include a steerable projector 106 that displays output from the information handling device 102.

The communication interface 306 and/or the I/O interface 310 may communicate with accessories, peripheral devices, input devices, output devices, and so forth. For example, in some embodiments, information handling devices 102 such as laptops, tablets, smartphones, etc., use the I/O interface 310 to communicate one or more steerable projectors 106, depicted in FIG. 1, FIG. 3, and FIG. 4. For example, a first steerable projector 106 may be a countertop smart automation device and a second steerable projector 106 be a ceiling-mounted steerable projector 106.

In certain embodiments, the I/O interface 310 may support various industry standards such as for example universal serial bus ("USB), Wi-Fi, Bluetooth®, ZigBee®, WiMax®, 802.16 and so forth, that may be used to communicate with the steerable projector 106, the at least one sensor 108, other information handling devices 102, and/or with other devices, peripherals, accessories, etc.

In various embodiments, the apparatus 300 includes a projection management apparatus 104 for the information handling device 102. In one embodiment, the projection management apparatus 104 includes a content selection module 312, a location module 314, a gaze tracking module 316, a viewing surface module 318, and/or a projector control module 320. In one embodiment, the projection management apparatus 104 determines (e.g., using the processor 302) whether a predetermined condition is satisfied for projecting audiovisual content to a user in a selected viewing context.

Referring again to FIG. 2 as well as FIG. 3, in various embodiments, the location module 314, the gaze tracking module 316, and the viewing surface module 318, and each of the modules may receive communications indicating one or more parameters of the field of view 218 of the user 208 for the selected viewing context and one or more characteristics of a target viewing surface 202 within the field of view 218 of the user 208.

In certain embodiments, the content selection module 312 receives a content selection command from the user 208, for example via the I/O interface 310, such as a voice command or a gesture that is detectable by the at least one sensor 108. Such content selection commands from the user 208 beneficially allow a user to continue performing manual tasks with the benefit of guidance provided by the projected audiovisual content without having to manually input commands to a cell phone, tablet or computer.

In other embodiments, the content selection module 312 receives the content selection command from the user 208 prior to beginning to perform the manual tasks where guidance provided by the projected content would be beneficial. In such embodiments, a recipe, set of building instructions, or audiovisual content for any type of activity where the ability to project the video portion of the audiovisual content on to the target viewing surface 202 may improve the user 208's ability to perform the tasks or where the user 208 wants to view the selected content while continuing to perform other tasks using the information handling device 102 such as the user's cell phone, tablet, computer, smart remote, etc.

In various embodiments, the projection management apparatus 104 includes a location module 314 that is useful in determining a location of the user in order to facilitate determining the viewing context of the user 208. In some embodiments, the location module 214 may receive location information, such as for example, global positioning system ("GPS") coordinates from an information handling device 102 such as a smartphone or tablet in the vicinity of the user 208.

In other embodiments, the location module 214 may receive location information associated with a particular room, setting, house, venue, or other stationary location based on a predetermined location associated with a particular device having a specific Internet protocol address. For example, the location module 314 may determine whether the user 208 is currently located in a kitchen, a bedroom, a theater room, and so on. In response to determining for example that the user 208 is located in the theater room, the location module 214 may select an area of a blank wall next to a big-screen television as the target viewing surface 202 for projecting the selected video portion of the audiovisual content.

In certain embodiments, the location module 314 may access a database of room dimensions, room layouts, and so forth which the location module 314 may communicate to other modules within the projection management apparatus 104 or to other information handling devices 102.

In some embodiments, the projection management apparatus 104 includes a gaze tracking module 316 that determines a current field of view of the user 208. The gaze tracking module 316, in various embodiments, receives image information and/or distance measurement information from the one or more sensors 108. For example, an image of the face 220 and the eyes 222 of the user 208 may be used to determine a current gaze point 206 of the user to wait so that the viewing surface module 318, may select an appropriate viewing surface 202.

The gaze tracking module 316 may implement one or any combination of gaze tracking algorithms to perform gaze tracking such as for example face detection, eye region localization, iris direction estimation, corneal reflection, neural networks, and so forth. In certain embodiments, the gaze tracking module 316 limits a change of frequency in the field of view of the user. For example, in some embodiments, the gaze tracking module 316 implements hysteresis algorithms that limit an update rate of gaze estimation in order to minimize distracting or unnecessary changes in the target viewing surface 202.

In various embodiments, the projection management apparatus 104 includes a viewing surface module 318 that uses data from the at least one sensor 108 to determine characteristics of the target viewing surface 202. For example, a sensor 108 may include a camera for capturing images to perform image-based plane detection in order to select a target viewing surface 202 that is generally planar.

The viewing surface module 318 may further distinguish between various surfaces by sensing the reflected color and/or texture of the target viewing surface. For example, the sensor 108 may sense reflected light, texture, different colors, and other characteristics that enable the projection management apparatus 104 distinguish between surfaces such as a clear glass kitchen window, a backsplash below kitchen cabinets, a painted wall, a cupboard door, a granite countertop, and so forth.

In certain embodiments, the projection management apparatus 104 performs an adjustment to an output of the at least one steerable projector 106 based on the one or more characteristics of the target viewing surface 202.

For example, in some embodiments, the viewing surface module 318 may communicate with the projector control module 320 to adjust the projection output in order to perform automatic keystone correction so that the projected content has a generally rectangular appearance despite being projected at a non-perpendicular angle to the target viewing surface 202.

Similarly, in various embodiments, the projection management apparatus 104 may be able to detect that a wall which may be selected as the target viewing surface 202 is painted a light green color and in response, the projection management apparatus 104 adjusts the color and the contrast of the video content being projected to a contrasting color that would be readable by the user 208 at a predetermined distance.

In some embodiments, the projection management apparatus 104 performs a projected object size adjustment. For example, depending on the texture of the target viewing surface, the distance between the user 208 and the target viewing surface 202, the projection management apparatus 104 may increase a font size and style to facilitate the readability of the projected content.

Figure 4:
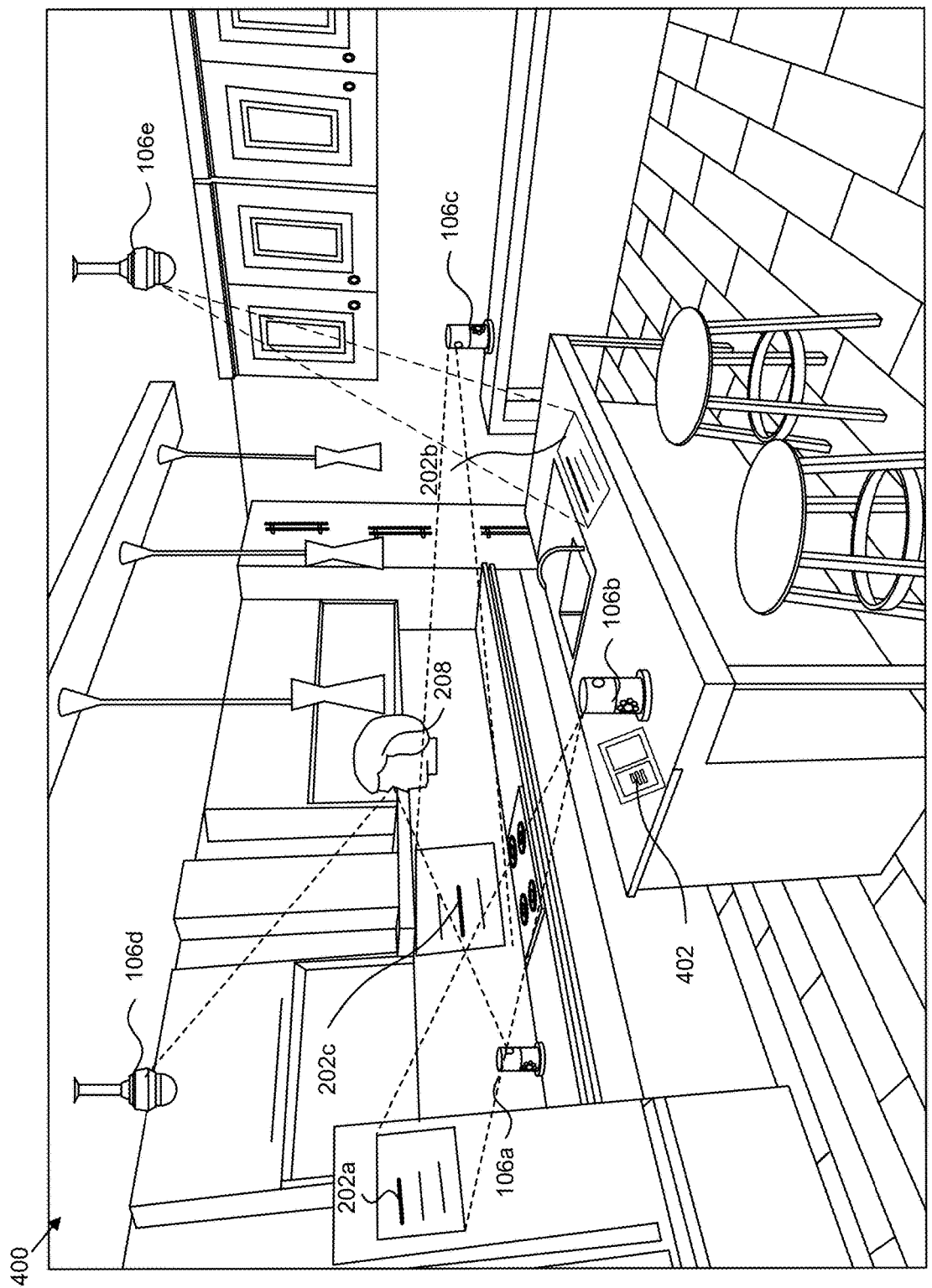
FIG. 4 is a perspective drawing illustrating another embodiment of an apparatus for controlling projection based on viewing context.

FIG. 4 is a perspective drawing illustrating one embodiment of an apparatus 400 for controlling projection based on viewing context. In one depicted embodiment, the apparatus 400 includes multiple steerable projectors 402a, 402b, and 402c that are integrated with countertop information handling devices. The apparatus also includes multiple steerable projectors 402d and 402e that are ceiling mounted.

In the depicted embodiment, each of the steerable projectors 402a-402e may include an instance of a projection management apparatus 104 and at least one sensor 108 (e.g., in the same housing as the steerable projector). The projection management apparatuses 104 corresponding to the respective steerable projectors 402a-402e are in data communication with each other over a wireless network such as the data network 110 depicted in FIG. 1.

In one example, the user 208 wants to prepare ratatouille, a classic casserole dish that includes eggplant, zucchini, tomatoes, minced garlic, parmesan cheese and other ingredients using the apparatus 400. The user 208 issues a voice command to select and project audiovisual content "ratatouille." The content selection module 312 of one of the projection management apparatus, determines based on viewing context information, communicated for example, from the location module 314 that the user 208 is located in the kitchen of his own home just prior to his customer dinner prep time and, in response, selects a recipe video with instructions as the audiovisual content to be projected (rather than selecting an animated feature film titled "Ratatouille" as the audiovisual content to be projected) which could have been the selected audiovisual content in response to the location module 314 determining that the user 208 is located in the home theater room with his family after dinner time.

With the audiovisual content selected and the location determined, in response to the projection management apparatus 104 associated with the steerable projector 106a or 106d determining that the gaze point of the user 208 is on the refrigerator, the corresponding projection management apparatus 104 communicates with the steerable projector 106b to display a list of vegetables needed on to a first target viewing surface 202a on the refrigerator door.

The projection management apparatus 104 may determine from the viewing context including for example the gaze point of the user, that the next step in the meal preparation is to wash and cut the vegetables retrieved from the refrigerator and in response communicates the relevant commands to the ceiling-mounted steerable projector 106e to project the recipe's instructions for proper washing and cutting of the vegetable for ratatouille on to a second target viewing surface 202b on the top of the kitchen island next to the sink.

The associated projection management apparatus may adjust the output size, color, and dimensions of the video output to perform keystone correction, enhance contrast, and so forth as explained above with respect to the apparatus 300 depicted in FIG. 3.

The user 208 may then turn toward the stovetop where the vegetables are to be cooked and one or more of the sensors 108 in the housing of the steerable projector 106a or 106d may detect that the gaze point of the user is on a target viewing surface 202c behind the stove. In response to the apparatus 400 determining that the video portion of the audiovisual content would be obstructed if projected by the steerable projector 106b (e.g., because the user 208 is standing between the steerable projector 106b and the target viewing surface 202c, the apparatus may communicate commands to cause a third steerable projector 106c to project the video portion of the content on to the third target viewing surface 202c.

In various embodiments, the audiovisual content to be projected may be retrieved from a local information handling device 102 or from a server 112 that streams audiovisual content. In certain embodiments, the video portion of the content may be live streamed or captured as a still image from a camera that captures an image of a paper recipe book 402. In such embodiments, the apparatus 400 is a technological improvement over the user 208 merely reading the recipe book because the apparatus projects the recipe on the target viewing surfaces 202a, 202b, and 202c without requiring the user 208 to turn and read the book for every step.

Figure 5:
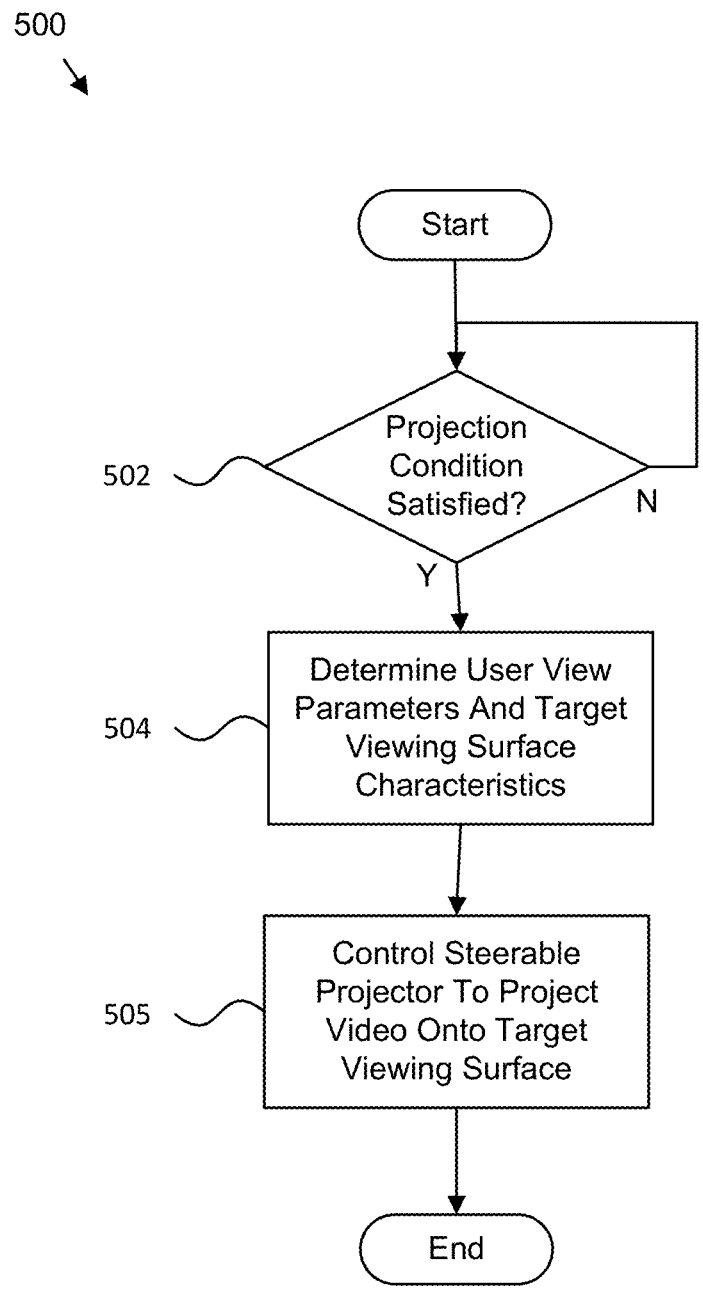
FIG. 5 is a schematic flow chart diagram illustrating one embodiment of a method for controlling projection based on viewing context.

FIG. 5 is a schematic flow chart diagram illustrating an embodiment of a method 500 for controlling projection based on viewing context. In one embodiment, the method 500 begins and determines 502 whether a predetermined condition is satisfied for projecting a video portion of audiovisual content to a user in a selected viewing context. The method 500 continues, in the embodiment, and determines 504 one or more parameters of a field of view of the user for the selected viewing context and one or more characteristics of a target viewing surface within the field of view.

In the embodiment, the method 500 further controls at least one steerable projector, based on the parameters, to project the video portion of the content on to the target viewing surface, in response to determining that the predetermined condition is satisfied, and the method 500 ends. In various embodiments, the method 500 may be implemented substantially as described above with respect to the functions of the system 100, and the apparatuses 200, 300, and 400, as depicted respectively in FIGS. 1-4.

Figure 6:
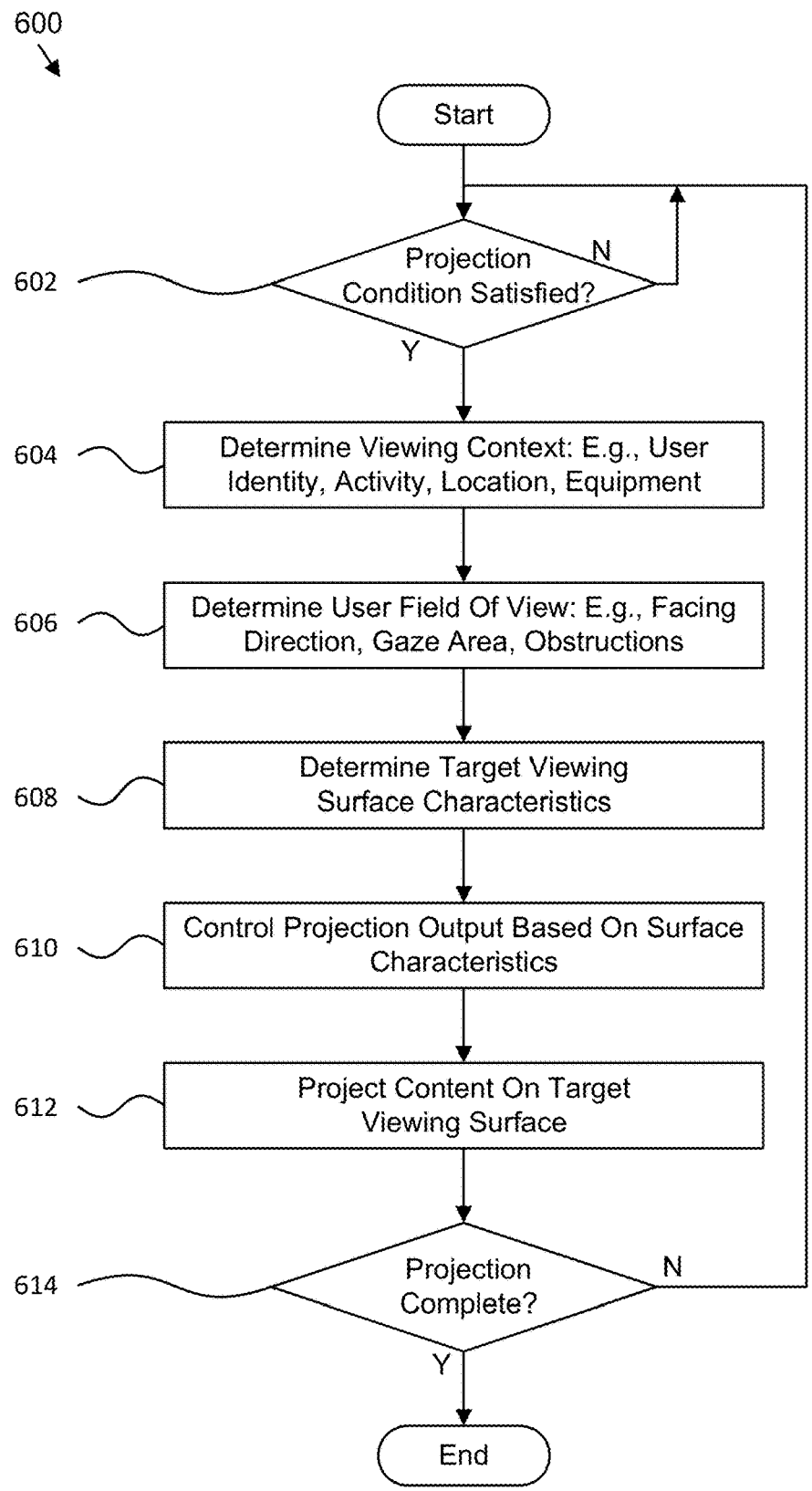
FIG. 6 is a schematic flow chart diagram illustrating one embodiment of a method for controlling projection based on viewing context.

FIG. 6 is a schematic flow chart diagram illustrating another embodiment of a method 600 for controlling projection based on viewing context. In various embodiments, one or more portions of the method 600 may be skipped or may be performed in a different order than is depicted in FIG. 6.

In one embodiment, the method 600 begins and determines 602, by use of a processor, whether a predetermined condition is satisfied for projecting a video portion of audiovisual content to a user in a selected viewing context. For example, in some embodiments, the predetermined condition may be satisfied at least in part by receiving a request or command to project audiovisual content. Satisfying the predetermined condition may further include verifying authorization for a particular user, time, place, etc., selecting content to be projected, and so forth as may be configured by a user, a vendor, and/or an administrator.

Although the act of determining 602 is depicted in one embodiment depicted in FIG. 6 as occurring before acts 604, 606, 608, 610, and 612, in various embodiments, act 602 may occur at any other place or at multiple places within the method 600. Similarly, the relative order of a portion or all of the acts 602 through 614 may be varied and/or certain acts may be added or omitted from the method 600 as depicted. Furthermore, certain acts depicted in FIG. 6 may be combined and/or partitioned.

In one embodiment, the method 600 continues and includes determining 604 the selected viewing context. For example, in some embodiments, determining 604 the selected viewing context includes determining an activity to be engaged in by the user in a predetermined location.

In certain embodiments, the activity to be engaged in by the user is such that the performance of the activity is enhanced by one or more hands of the user being free to perform one or more manual tasks based on guidance provided by the content projected on to the target viewing surface. For example, as depicted in FIG. 4, a user may be located in a kitchen and may be preparing a meal that involves manual tasks such as chopping, stirring, forming, or similar tasks. Other examples may include controlling projection based on viewing context such as for assembling or repairing articles, doing physical therapy or fitness exercises, projecting selected audiovisual content for viewing while watching or interacting with other information handling devices, and so forth.

In various embodiments, determining 604 the selected viewing context may include determining the identify of a user, determining an activity to be performed by the user, determining a location of a room, user, device, surface, and so forth. Other viewing context parameters may include date, time, temperature, ambient light, user preferences, etc.

In some embodiments, the method 600 continues and includes determining 606 one or more parameters of a field of view of the user for the selected viewing context and determining 608 one or more characteristics of a target viewing surface within the field of view. Determining 606 the parameters of the field of view may be based on eye gaze detection, user location information, predefined fields of view, and so forth. In some embodiments, determining the one or more parameters of the field of view of the user is performed by at least one sensor such as a distance sensor, an eye-gaze sensor, and/or an imaging sensor, or combinations of these and other sensors. In certain embodiments, the method 600 may further include limiting a frequency of change in the field of view, e.g., to provide smooth projection of the content without unnecessary interruptions.

Determining 608 the target viewing surface characteristics may include in some embodiments, plane detection, determining surface color, surface texture, surface reflectiveness, surface uniformity, as well as any other surface characteristic that may be useful for selecting an optimal target viewing surface.

In various embodiments, the method 600 continues and includes controlling 610 at least one steerable projector, based on the parameters and projecting 612 the video portion of the content on to the target viewing surface, in response to determining that the predetermined condition is satisfied.

In certain embodiments, the performance of the activity is facilitated by projecting the content on to the target viewing surface. For example, by providing information or guidance that is useful, helpful, or desirable for performing the activity and at the same time enhancing the ability of the user to face different directions, move to various locations, and so forth which minimizing disruption of such user actions to performance of the activity. In some embodiments, one or more hands of the user are available to perform one or more manual tasks based on guidance provided by the content projected on to the target viewing surface.

In some embodiments, determining 608 the target viewing surface characteristics includes receiving a light measurement of the target viewing surface. The light measurement may be used to determine a surface color, distance, texture or similar. In various embodiments, the method 600 continues and controls 610 projection output based on the surface characteristics. Controlling 610 projection output may include in some embodiments, performing an adjustment to an output of the at least one steerable projector to enhance viewability of the content projected on the target viewing surface. In various embodiments, the adjustment is selected from a color adjustment, a font size adjustment, and/or the like.

In certain embodiments, the method 600 may be implemented substantially as described above with respect to the function of the system 100, and the apparatuses 200, 300, 400, and 500 depicted respectively in FIGS. 1-5.

Thus, the system 100, the apparatuses 200, 300, and 400, and the methods 500 and 600 may operate according to the various embodiments disclosed herein to improve projection technology by controlling project based on viewing context. These embodiments provide more convenient ways to view and adjust projection content while engaging in other activities.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor;
   a memory that stores code executable by the processor to determine whether a predetermined condition is satisfied for projecting audiovisual content, a video portion of the audiovisual content comprising guidance for performing one or more manual tasks by hand to a user in a selected viewing context in which the user does not use hand action to interact with an interface for controlling projection of the audiovisual content;
   at least one sensor that communicates to the processor, one or more parameters indicating a facing direction of the user and an eye gaze direction of the user for the selected viewing context, wherein the at least one sensor implements a hysteresis algorithm to limit an update rate of eye gaze estimation and wherein the at least one sensor further communicates one or more characteristics of the target viewing surface within the field of view and proximate to the manual task performance location;
   at least one audio device configured to communicate a voice command from the user to the processor to make a video content selection to obtain updated guidance while allowing the user to continue performing the manual tasks by hand without the user interacting with an interface for the apparatus by hand; and
   at least one steerable projector this is controlled, based on the one or more parameters that do not require sensing of the user's hands, to project a video portion of the audiovisual content on to the target viewing surface proximate to the manual task performance location such that the target view surface and the performance of the manual task by hand are concurrently viewable by the user, in response to the processor determining that the predetermined condition is satisfied.

2. The apparatus of claim 1, wherein:
the selected viewing context comprises an activity comprising the one or more manual tasks to be performed by hand by the user in a predetermined location; and
performance of the activity is facilitated by projecting the video portion of the audiovisual content on to the target viewing surface.

3. The apparatus of claim 2, wherein one or more hands of the user are available to perform the one or more manual tasks by hand while viewing the manual tasks and the guidance provided by the video portion of the audiovisual content projected on to the target viewing surface proximate to the manual task performance location.

4. The apparatus of claim 1, wherein the processor performs an adjustment to a selected aspect of the video portion of the audiovisual content projected by the at least one steerable projector based on the one or more characteristics of the target viewing surface detected by the sensor selected from surface color, surface texture, surface reflectiveness, surface uniformity, and combinations thereof.

5. The apparatus of claim 4, wherein the adjustment to the selected aspect of the video portion comprises at least one of a color adjustment, a font style adjustment, and a font size adjustment.

6. The apparatus of claim 1, wherein the at least one sensor comprises a distance sensor, an eye-gaze sensor, and an imaging sensor.

7. The apparatus of claim 1, wherein the imaging sensor is configured to detect the surface color, surface texture, surface reflectiveness, and/or the surface uniformity of the target viewing surface.

8. The apparatus of claim 1, wherein the processor limits a frequency of change in the field of view by limiting the update rate of gaze estimation detected by the eye gaze sensor in order to minimize changes to the target viewing surface while the user is viewing and performing the manual task by hand.

9. The apparatus of claim 1, wherein:
the at least one steerable projector comprises a first projector and a second projector; and
the processor selects the second projector for projecting the video portion of the audiovisual content in response to determining that the video portion of the audiovisual content would be obstructed if projected by the first projector on the target view surface proximate to the manual task performance location.

10. The apparatus of claim 1, wherein the at least one audio device is configured to play an audio portion of the audiovisual content in response to the processor determining that the predetermined condition is satisfied.

11. The apparatus of claim 1, wherein the at least one audio device is integrated into a housing for the at least one steerable projector.

12. A method comprising:
determining whether a predetermined condition is satisfied for projecting a video portion of audiovisual content, the video portion of the audiovisual content comprising guidance for performing one or more manual tasks by hand to a user in a selected viewing context in which the user does not use hand action to interact with an interface for controlling projection of the audiovisual content;
determining one or more parameters of a field of view and an eye gaze direction of the user for the selected viewing context and sensing one or more characteristics of a target viewing surface within the field of view, wherein a hysteresis algorithm limits an update rate of the eye gaze direction estimation; and
controlling at least one steerable projector, based on the parameters, to project the video portion of the audiovisual content on to the target viewing surface proximate to the manual task performance location such that the target view surface and the performance of the manual task by hand are concurrently viewable by the user, in response to determining that the predetermined condition is satisfied.

13. The method of claim 12, wherein:
the selected viewing context comprises an activity comprising the one or more manual tasks to be performed by hand by the user in a predetermined location; and
the performance of the activity is facilitated by projecting the content on to the target viewing surface.

14. The method of claim 12, wherein one or more hands of the user are available to perform the one or more manual tasks by hand while viewing the manual tasks and the guidance provided by the video portion of the audiovisual content projected on to the target viewing surface proximate to the manual task performance location.

15. The method of claim 12, further comprising:
receiving a sensor measurement of one or more characteristics of the target viewing surface the one or more characteristics selected from surface color, surface texture, surface reflectiveness, surface uniformity, and combinations thereof; and
performing an adjustment based on the sensed characteristics to a selected aspect of the video portion of the audiovisual content projected by the at least one steerable projector to enhance viewability of the content projected on the target viewing surface proximate to the manual task performance location.

16. The method of claim 15, wherein the adjustment to the selected aspect of the video portion is selected from a color adjustment, a font style adjustment, a font size adjustment, and combinations thereof.

17. The method of claim 12, wherein determining the one or more parameters is performed by one or more sensors comprising a distance sensor, an eye-gaze sensor, and an imaging sensor.

18. The method of claim 12, further comprising limiting a frequency of change in the field of view by limiting the update rate of gaze estimation detected by the eye gaze sensor in order to minimize changes to the target viewing surface while the user is viewing and performing the manual task by hand.

19. A computer program product comprising a computer readable non-transitory storage medium having program instructions embodied therewith, the program instructions executable by a processor to cause the processor to:
determine whether a predetermined condition is satisfied for projecting a video portion of a content comprising guidance for performing one or more manual tasks by hand to a user in a selected viewing context in which the user does not use hand action to interact with an interface for controlling projection of the audiovisual content;

determine one or more parameters of a field of view and an eye gaze direction of the user for the selected view context and one or more characteristics of a target viewing surface within the field of view and proximate to the manual task performance location, wherein a hysteresis algorithm limits an update rate of eye gaze estimation; and control at least one steerable projector, based on the parameters, to project the video portion of the content on to the target viewing surface proximate to the manual task performance location such that the target view surface and the performance of the manual task by hand are concurrently viewable by the user, in response to determining that the predetermined condition is satisfied.

* * * * *